Jan. 16, 1951  M. A. SWAYZE  2,538,285
APPARATUS FOR SEPARATING SOLID MATERIALS
Filed March 18, 1948  2 Sheets-Sheet 1
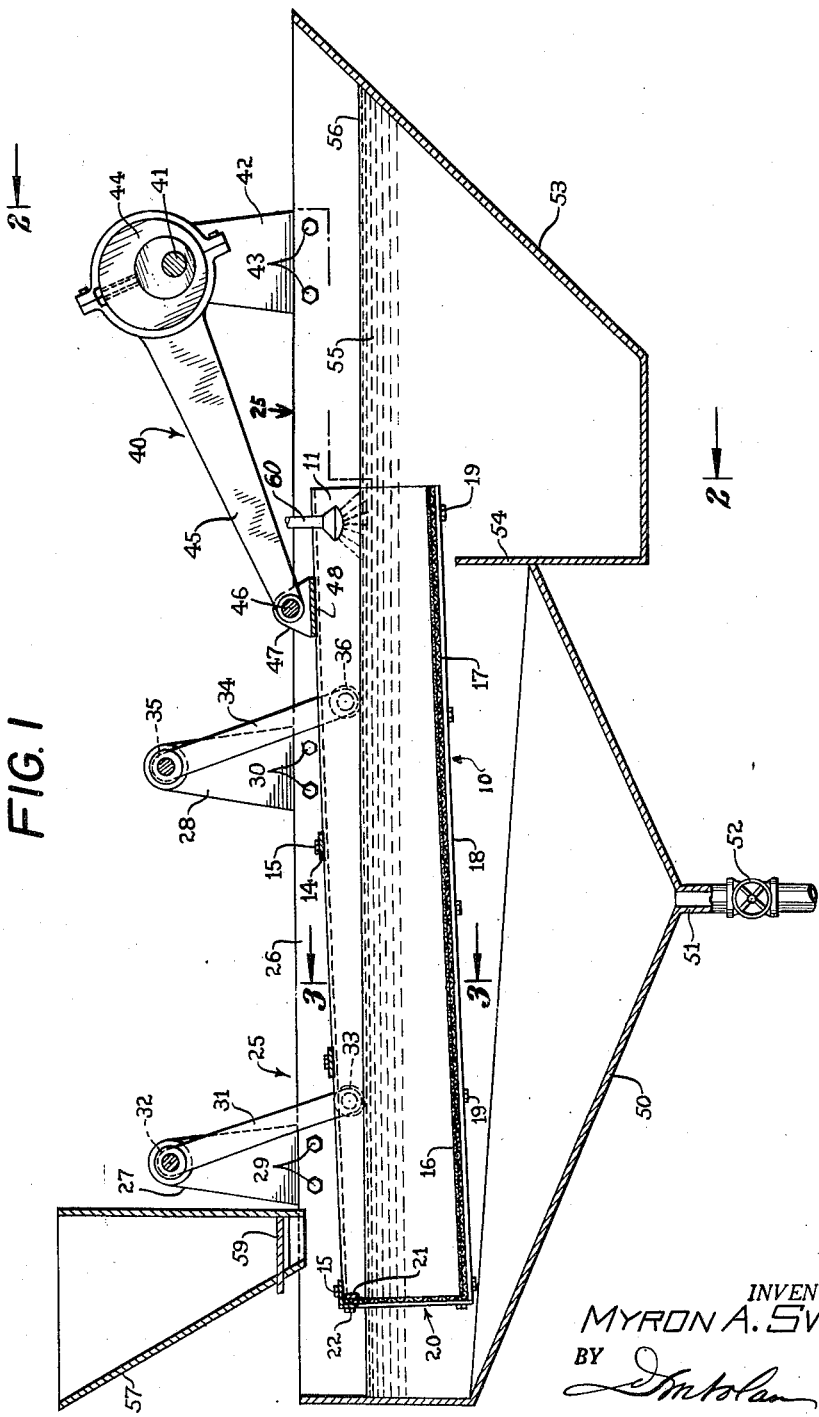
INVENTOR.
MYRON A. SWAYZE
BY
ATTORNEY Jan. 16, 1951 M. A. SWAYZE 2,538,285
APPARATUS FOR SEPARATING SOLID MATERIALS
Filed March 18, 1948 2 Sheets-Sheet 2

INVENTOR.
MYRON A. SWAYZE
BY
ATTORNEY

Patented Jan. 16, 1951

2,538,285

UNITED STATES PATENT OFFICE 2,538,285

APPARATUS FOR SEPARATING SOLID MATERIALS

Myron A. Swayze, Hudson, N. Y., assignor to Lone Star Cement Corporation, New York, N. Y., a corporation of Maine Application March 18, 1948, Serial No. 15,554

7 Claims. (Cl. 209—269)

1

This invention relates to the recovery of granular materials and more particularly to a method and apparatus for removing finely divided particles from mixtures of such particles and coarser granular materials.

An object of this invention is to separate granular materials from finely divided particles that are commingled therewith.

Another object of this invention is to separate effectively and economically broken oyster shells from mixtures thereof and finely divided mud, slime and sand.

Various apparatus and methods have been suggested to separate finely divided particles, such as fine mud, slime or sand, from mixtures containing coarser granular materials. For example, broken oyster shells, consisting mainly of flat flakes, are usually commingled with finely divided slime or sand, and attempts have been made to separate the finely divided particles from the oyster shells with screening equipment operated in an environment of air, or with washing apparatus in which the finely divided particles are removed by suspending the mixture in an upward stream of water. These attempts have largely failed because with the air operated screening equipment the surface tension of water holds the particles of sand and shell pieces so firmly together that they cannot be separated, while with the prior water washing apparatus, a current of water sufficient to lift the sand particles and float them out of the system also removes shell pieces of much greater area due to the thinness and light weight of the shell pieces.

In accordance with this invention, relatively coarse granular material is separated from commingled finely divided particles such as mud, slime or sand, effectively and efficiently. The apparatus and method of this invention are particularly applicable to the separation of broken oyster shells from finely divided mud, slime or sand. The apparatus by which this separation is effected comprises an open trough with a substantially flat screen on the bottom thereof adapted to pass the finely divided particles and retain the coarser granular material. This screen is preferably extended upwardly to close the end of the trough at which the material is introduced. The trough is suspended in water to a depth at which the material is completely submerged when first introduced. The trough is maintained with its bottom screen at an angle of 1–15°, and preferably 5–8°, to the horizontal, so that the discharge end is at a higher level in the water than the end at which the materials are introduced.

2

Hangers, for supporting the trough, are so constructed and arranged that they permit the trough to swing upwardly in the forward portion of the oscillation cycle, and downwardly on the return stroke towards the end where the materials are introduced. The angle through which the hangers travel in their forward and backward movement may be 5–10°, more or less. The mean inclination of the hangers of the trough from the vertical may be in the range of 15–40° plus the angle of inclination of the trough, and preferably in the range of 25–30°, plus the angle of inclination of the trough. Oscillations of the trough are effected by any suitable mechanism, such as a cam shaft or the like, connected to the trough by a driving arm. The rate of oscillation of the trough for satisfactory results is from 60–300 oscillations per minute, and preferably from 150–200 oscillations per minute. The amplitude of the swing of the trough may be varied from 0.5" to 6", depending on such variables as length of trough, quantity of contaminating material to be removed and rate of oscillation. An amplitude of 1" to 3" will give satisfactory results.

Upward inclination of the trough toward the discharge end has the advantage of decreasing or stopping a natural current of water over the load on the screen toward the discharge end, set up by the oscillating motion of the screen. This current would carry fine suspended waste matter over the end of the screen with the cleaned material. This current is stopped by regulating the level of water in the tank so that the upper portion of the load on the screen, but not the screen table, emerges from the surface of the water at the discharge end of the apparatus, prior to its discharge. Suspended matter in water in the interstices between cleaned material particles may be washed out by a water spray or jet, or a plurality of sprays or jets which play on the material as or before it is discharged from the trough.

A more comprehensive understanding of this invention is obtained by reference to the accompanying drawings in which:

Figure 1 is a vertical longitudinal section through a preferred arrangement of apparatus embodying this invention;

Figures 2, 3:
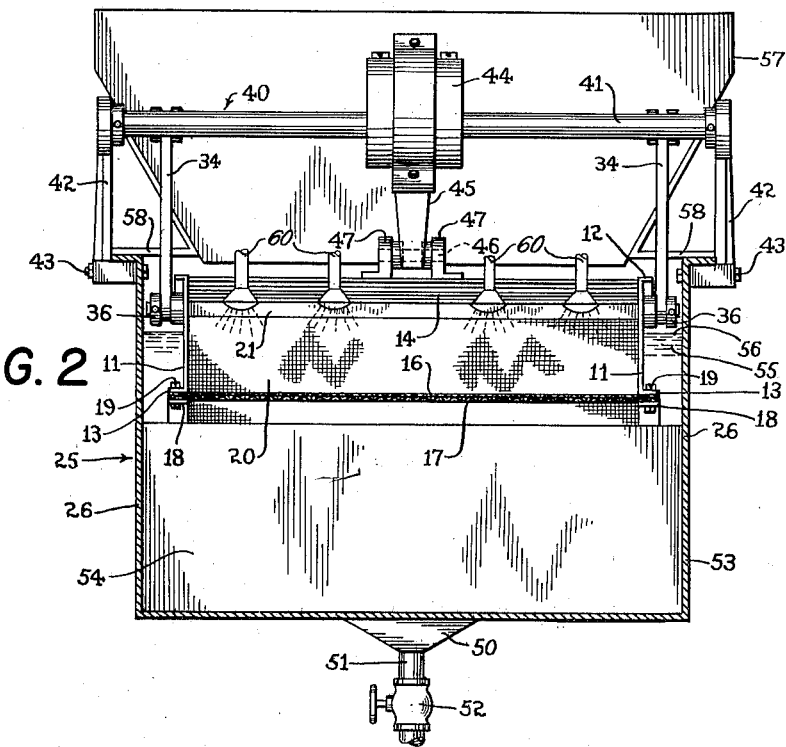
Figure 2 is an enlarged cross-sectional view of the apparatus shown in Figure 1 along staggered line 2—2 thereof.
Figure 3 is an enlarged cross-sectional view of part of the apparatus shown in Figure 1 along line 3—3 thereof.

In the drawings, a trough, generally indicated by numeral 10 and best shown in Figures 1 and 3, comprises a pair of parallel imperforate side walls 11, each of which is provided with an outwardly projecting lateral top flange 12 and bottom flange 13. Side walls 11 are maintained in the illustrated spaced-apart relation by means of a series of cross bars 14 that are attached to top flanges 12 by bolts 15. Attached to bottom flanges 13 of side walls 11, and forming a substantially planar or flat bottom for the trough, is a relatively fine screen 16, which is capable of passing finely divided particles and retaining coarser granular material. Directly beneath screen 16 and co-extensive therewith is a coarser screen 17 made of heavier material than the material of screen 16. Screen 17, which serves as a support for screen 16, is secured to screen 16 by any suitable means to assure substantially non-abrasive action between screens 16 and 17. Both screens 16 and 17 are secured to bottom flanges 13 by any suitable means, such as plates 18 and bolts 19. Trough 10 is closed at one end by a perforate end 20, preferably consisting of upward extensions of screens 16 and 17 that are clamped between a pair of plates 21 (Figure 1) through the medium of bolts 22, plates 21 being in turn secured to side walls 11 in any desired manner known to the art. A pair of vertical plates, not shown in the drawings, are used to clamp the vertical perforate end to the trough assembly. The other end of the trough is open.

A framework, comprising a receptacle 25, includes a pair of side walls 26. Two pairs of upstanding brackets 27 and 28 are secured to receptacle walls 26 by bolts 29 and 30, respectively. Each of a pair of hangers 31 is pivotally connected to a bracket 27 and the corresponding side wall of the trough as indicated at 32 and 33, while each of a second pair of hangers 34 is pivotally connected to a corresponding bracket 28 and trough side wall, as indicated at 35 and 36. It is apparent from an inspection of the drawings that the hangers 31 and 34 support the trough 10 in receptacle 25 and in spaced relation to its interior surface, permitting longitudinal oscillatory movement of the trough with respect to the receptacle.

The apparatus of this invention includes a mechanism 40 that cooperates with hangers 31 and 34 to impart oscillatory movement to trough 10. Mechanism 40 comprises a rotary shaft 41 supported by a pair of spaced brackets 42, each of which is affixed to a corresponding receptacle wall 26 by bolts 43. A circular cam disc 44 is mounted eccentrically on and rotatable with shaft 41. One end of a pitman 45 embraces cam disc 44 and the other end of the pitman is connected to a pivot pin 46 that is carried by spaced brackets 47. Brackets 47 are in turn secured to a cross bar 48 that is mounted on trough 10.

Hangers 31 and 34 and mechanism 40 are so constructed and arranged with respect to trough 10 that the bottom of the trough is inclined upwardly from the horizontal in the direction of the open end of the trough at an angle between 1-15° and preferably at an angle between 5-8°. The angle through which the hangers 31 and 34 travel in their forward and backward movement is between 5-10°. The mean inclination of the hangers 31 and 34 from the vertical is desirably 25-30° plus the angle of inclination of the trough.

Receptacle 25 comprises a silt tank 50 having a discharge conduit 51, that is provided with a valve 52 for controlling the continuous or intermittent withdrawal of silt accumulations and the like. Receptacle 25 also includes a receiving hopper 53. A partition or weir 54 extends across the interior of the receptacle and constitutes a common wall of tank 50 and hopper 53. The receptacle is adapted to contain a body of water or other suitable washing liquid 55, the normal level of which is indicated at 56. As is best shown in Figure 1, weir 54 terminates below water level 56. The weir prevents fine particles that have previously passed downwardly through the trough bottom wall and into tank 50, from mixing with the clean product received in hopper 53 in the course of operation.

A supply hopper 57 is attached to receptacle 25 by brackets 58 (Figure 2) and may be provided with a gate valve or the like 59 at its bottom or outlet end. A plurality of water jets 60 may be provided at the discharge end of the trough 10 which spray water on the material as or before it is discharged from the trough.

For the purpose of briefly describing the operation of the illustrated apparatus, it is first assumed that the parts are assembled as shown in Figure 1, and that receptacle 25 contains a body of water 55. Trough 10 is immersed in water 55 and is adapted to be oscillated with respect to the receptacle tank 25 on rotation of shaft 41. A supply of the mixture of granular material and finely divided particles previously introduced into hopper 57 is discharged therefrom into the closed or receiving end portion of trough 10. The mixture sinks and adherence of the component parts to each other, due to the surface tension of the water, ceases. As trough 10 moves rearwardly from its forward position, the rearward and downward swing of the trough causes a rush of water from below the screen 16 and through the meshes of the screen which momentarily raises the bed of mixture off the screen, allowing the screen to drop back without carrying the mixture with it. This also creates a suction in the bed of the mixture in the trough, drawing the finely divided particles downwardly toward the screen. The current of water through the screen also serves to clean the screen of particles which might have lodged between the meshes thereof in previous swings. On the return forward and upward swing of the trough, the bed of mixture is again contacted by the bottom screen and moves forwardly with it. The lifting accompanying the forward movement creates a down current of water through the bed of the mixture and the screen, carrying fine particles with it, and into tank 50.

The alternate forward and rearward oscillatory movement of the trough causes the bed of material carried thereby to advance rapidly with essentially no disturbance in the bedding of the material except that the fine portions thereof progress downward as the bed advances towards the open or discharge end of the trough and rapidly cleans the material of mud and other fine particles that may be associated therewith. The granular material cleansed by this procedure is then discharged into receiving hopper 53 from which it may be recovered by a suitable rake, drag conveyor or other means. So long as the screen is even slightly under water at the point of discharge, desired screening action is maintained and travel of solid material along the trough is essentially without appreciable sliding action on the surface of the bottom screen 16, even if part of the load is above water at the discharge or open end of the trough. Since the mixture is buoyed up by the water in which it is immersed when on the screen, wear on the screen is markedly decreased from what it would be if the procedure were carried out in air.

From the foregoing, it is believed that the method and apparatus for practicing my instant invention will be readily comprehended by persons skilled in the art. It is to be clearly understood, however, that various changes in the apparatus herewith shown and described and in the method of practicing the invention, outlined herein, may be resorted to without departing from the spirit of the invention as defined by the appended claims.

I claim:

1. In apparatus for separating granular material from a mixture of such material and finely divided particles, a tank adapted to contain a body of water, a trough open at one end and closed at the other end and comprising a pair of side walls, a perforate end wall across the closed end of said trough and a substantially planar perforate bottom extending to the open end of said trough and adapted to pass said finely divided particles and retain said granular material, the tops of said side walls and said end wall remaining above the level of water in said tank during the operation of said apparatus, means for supporting said trough within and in spaced relation to the interior of said tank and for imparting oscillatory movement to said trough with respect to said tank, said bottom being inclined upwardly from the horizontal in the direction of said open end at an angle between 1–15° and the open end of said trough being completely submerged during the operation of said apparatus.

2. In apparatus for separating granular material from a mixture of such material and finely divided particles, a tank adapted to contain a body of water, a trough open at one end and closed at the other end and comprising a pair of spaced side walls, a perforate end wall across the closed end of said trough and a substantially planar perforate bottom extending to the open end of said trough and adapted to pass said finely divided particles and retain said granular material, the tops of said side walls and said end wall remaining above the level of water in said tank during the operation of said apparatus, hangers for supporting said trough within and in spaced relation to the interior of said tank and for imparting oscillatory movement to said trough with respect to said tank, said bottom being inclined upwardly from the horizontal in the direction of said open end at an angle between 1–15°, the open end of said trough being completely submerged during the operation of said apparatus and said hangers being inclined from the vertical towards the open end of the trough at a mean angle between 15–40° in addition to the angle of inclination of the trough.

3. In apparatus for separating granular material from a mixture of such material and finely divided particles, a tank adapted to contain a body of water, a trough open at one end and closed at the other end and comprising a pair of spaced side walls, a perforate end wall across the closed end of said trough and a substantially planar perforate bottom extending to the open end of said trough and adapted to pass said finely divided particles and retain said granular material, the tops of said side walls and said end wall remaining above the level of water in said tank during the operation of said apparatus and the open end of said trough being completely submerged during the operation of said apparatus and means for supporting said trough within and in spaced relation to the interior of said tank and for imparting oscillatory movement to said trough with respect to said tank, said means comprising a plurality of hangers pivotal with respect to said tank and said trough about spaced axes, said means being so constructed and arranged that said bottom is inclined upwardly from the horizontal in the direction of said open end at an angle between 1–15°.

4. In apparatus for separating granular material from a mixture of such material and finely divided particles, a tank adapted to contain a body of water, a trough open at one end and comprising a pair of spaced side walls, a substantially planar perforate bottom extending to the open end of said trough, and a perforate end wall across its other end, said bottom and said end wall being adapted to pass said finely divided particles and retain said granular material, the tops of said side walls and said end wall remaining above the level of water in said tank during the operation of said apparatus and the open end of said trough being completely submerged during the operation of said apparatus, means for supporting said trough within and in spaced relation to the interior of said tank and for imparting oscillatory movement to said trough with respect to said tank, said means being so constructed and arranged that said bottom is inclined upwardly from the horizontal in the direction of said open end at an angle between 1–15°.

5. In apparatus for separating granular material from a mixture of such material and finely divided particles, a receptacle adapted to contain a body of water, an upstanding partition across the interior of the receptacle and terminating below the normal level of said water, said partition dividing the interior of the receptacle into a first compartment and a second compartment, a trough open at one end and comprising a pair of spaced side walls, a substantially planar perforate bottom extending to the open end of said trough and a perforate wall across its other end, said bottom and end wall being adapted to pass said finely divided particles and retain said granular material, the tops of said side walls and said end wall remaining above the level of water in said tank during the operation of said apparatus and the open end of said trough being completely submerged during the operation of said apparatus and means for supporting said trough within and in spaced relation to the interior of said tank and for imparting oscillatory movement to said trough with respect to said tank, said trough being positioned so that a major portion thereof, including said closed end, is disposed in said first compartment and a minor portion thereof, including said open end, is disposed in said second compartment, said means being so constructed and arranged that said bottom is inclined upwardly from the horizontal in the direction of said open end at an angle between 1–15°.

6. In apparatus for separating granular material from a mixture of such material and finely divided particles, a receptacle adapted to contain a body of water, an upstanding partition across the interior of the receptacle and terminating below the normal level of said water, said partition dividing the interior of the receptacle into a first compartment and a second compartment, a trough open at one end and comprising a pair of spaced side walls, a substantially planar perforate bottom extending to the open end of said trough and a perforate wall across its other end, said bottom and said end wall being adapted to pass said finely divided particles and retain said granular material, the tops of said side walls and said end wall remaining above the level of water in said tank during the operation of said apparatus and the open end of said trough being completely submerged during the operation of said apparatus and hangers for supporting said trough within and in spaced relation to the interior of said tank and for imparting oscillatory movement to said trough with respect to said tank, said trough being positioned so that a major portion thereof, including said closed end, is disposed in said first compartment and a minor portion thereof, including said open end, is disposed in said second compartment, said bottom being inclined upwardly from the horizontal in the direction of said open end at an angle between 1–15° and said hangers being inclined from the vertical towards said open end at a mean angle between 15–40° in addition to the angle of inclination of the trough.

7. In apparatus for separating granular material from a mixture of such material and finely divided particles, a receptacle adapted to contain a body of water, an upstanding partition across the interior of the receptacle and terminating below the normal level of said water, said partition dividing the interior of the receptacle into a first compartment and a second compartment, a trough open at one end and comprising a pair of spaced side walls, a substantially planar perforate bottom extending to the open end of said trough and a perforate wall across its other end, said bottom and said end wall being adapted to pass said finely divided particles and retain said granular material, the tops of said side walls and said end wall remaining above the level of water in said tank during the operation of said apparatus and the open end of said trough being completely submerged during the operation of said apparatus and hangers for supporting said trough within and in spaced relation to the interior of said tank and for imparting oscillatory movement to said trough with respect to said tank, said trough being positioned so that a major portion thereof, including said closed end, is disposed in said first compartment and a minor portion thereof, including said open end, is disposed in said second compartment, said bottom being inclined upwardly from the horizontal in the direction of said open end at an angle between 5–8° and said hangers being inclined from the vertical towards said open end at a mean angle between 25–30° in addition to the angle of inclination of the trough.

MYRON A. SWAYZE.

REFERENCES CITED

The following references are of record in the file of this patent:

UNITED STATES PATENTS

| Number | Name | Date |
|---|---|---|
| 492,039 | Meurer | Feb. 21, 1893 |
| 788,688 | Wild | May 2, 1905 |
| 803,550 | Callow | Nov. 7, 1905 |
| 830,349 | Meurer | Sept. 4, 1906 |
| 1,005,900 | Stromborg | Oct. 17, 1911 |
| 1,070,552 | Steffy | Aug. 19, 1913 |
| 2,319,901 | Hall | May 25, 1943 |
| 2,374,456 | Revndel | Apr. 24, 1945 |

FOREIGN PATENTS

| Number | Country | Date |
|---|---|---|
| 54,911 | Netherlands | June 16, 1943 |